(12) United States Patent
Muth

(10) Patent No.: US 7,257,740 B2
(45) Date of Patent: Aug. 14, 2007

(54) CIRCUIT FOR DETECTING GROUND OFFSET OF PARTS OF A NETWORK

(75) Inventor: Matthias Muth, Stelle (DE)

(73) Assignee: NXP B.V., Eindhoven (NL)

( * ) Notice: Subject to any disclaimer, the term of this patent is extended or adjusted under 35 U.S.C. 154(b) by 479 days.

(21) Appl. No.: 10/517,241

(22) PCT Filed: Jun. 10, 2002

(86) PCT No.: PCT/IB03/02127

§ 371 (c)(1),
(2), (4) Date: Dec. 7, 2004

(87) PCT Pub. No.: WO03/104038

PCT Pub. Date: Dec. 18, 2003

(65) Prior Publication Data

US 2005/0268166 A1    Dec. 1, 2005

(30) Foreign Application Priority Data

Jun. 10, 2002  (DE) ............................. 102 25 556

(51) Int. Cl.
*G06F 11/00* (2006.01)
(52) U.S. Cl. ...................... 714/43; 714/712
(58) Field of Classification Search ............... 714/43, 714/712
See application file for complete search history.

(56) References Cited

U.S. PATENT DOCUMENTS 4,551,841 A * 11/1985 Fujita et al. ............... 714/22
4,951,283 A * 8/1990 Mastrocola et al. .......... 714/43
4,953,167 A * 8/1990 Byers et al. ................ 714/43

(Continued)

FOREIGN PATENT DOCUMENTS

WO    WO97 36184    10/1997

*Primary Examiner*—Bryce P. Bonzo
(74) *Attorney, Agent, or Firm*—Peter Zawilski

(57) ABSTRACT

To improve a method as well as a circuit arrangement (100) for detecting the ground offset of parts of a network system, more particularly for checking the ground contact between network control units where data are sent and received over at least one bus system so that, on the one hand, prior to a breakdown event already a warning can be obtained in this respect that the state of the ground connection between the control units is no longer optimal but, on the other hand, ground defects are not shown by mistake, there is proposed 'a! that in the idle state at least one bus line provided for receiving data and/or of at least one receiver line (24), after a predefinable first time period has elapsed, the level voltage (14) of this at least one bus line is scanned and compared with at least one predefinable limit or reference potential value, 'b! in that if the limit or reference potential value is exceeded, at least one ground error signal is generated, and 'c! in that in dependence on the fact whether until a predefinable second time period has elapsed, which is started at the same time as the predefinable first time period and is longer than the predefinable first time period, 'c.1! the idle state of the at least one bus line or of the at least one receiver line (24) is still there, or 'c.2! the idle state of the at least one bus line or of the at least one receiver line (24) is no longer there, the ground error signal is acknowledged or not acknowledged, respectively.

10 Claims, 1 Drawing Sheet

U.S. PATENT DOCUMENTS

| | | | |
|---|---|---|---|
| 5,555,456 A * | 9/1996 | Waite | 340/635 |
| 6,115,831 A * | 9/2000 | Hanf et al. | 714/43 |
| 6,396,282 B1 * | 5/2002 | Minuth et al. | 324/509 |
| 6,438,462 B1 * | 8/2002 | Hanf et al. | 700/297 |
| 6,493,401 B1 * | 12/2002 | Erckert | 375/316 |
| 6,587,968 B1 * | 7/2003 | Leyva | 714/43 |
| 6,643,727 B1 * | 11/2003 | Arndt et al. | 710/314 |
| 6,912,671 B2 * | 6/2005 | Christensen et al. | 714/25 |
| 6,915,459 B2 * | 7/2005 | Tinsley et al. | 714/43 |
| 7,148,723 B2 * | 12/2006 | Watkins | 326/62 |

\* cited by examiner

CIRCUIT FOR DETECTING GROUND OFFSET OF PARTS OF A NETWORK

FIELD OF THE INVENTION

The present invention relates to a method of detecting the ground offset of parts of a network system, more particularly of checking the ground contact between network control units, where data are sent and received over at least one bus system.

The present invention further relates to a circuit arrangement for detecting the ground offset of parts of a network system, more particularly for testing the ground contact between network control units, where data can be sent and received over at least one bus system.

BACKGROUND OF THE INVENTION

Systems, more particularly used in automotive electronics, which systems are networked by serial bus systems, are generally sensitive to ground offsets between the component parts; this especially holds for bus systems supporting one-wire operation such as, for example, error-tolerant CAN (Controller Area Network) physical layers. If in such systems the ground offset between the component parts becomes too large, there will be interference or even a breakdown of the communication.

According to the state of the art the bus lines themselves are used at present to detect from their idle level whether there is a deviation from the nominal level or not. The idle state of the bus lines results from the superpositioning of all the components in the network system and allows a comparison with the local supply voltage. When a predefined limit value is exceeded, it should be assumed that the local ground connection is no longer optimal and a warning may be issued.

For the correct evaluation of the bus signal it is now important for the bus to be in its idle state and just then no active transmissions take place over the bus; when a user is actively sending, a comparison with the local supply will always lead to a wrong result. To avoid this, document WO 97/36184 A1 proposes to utilize the digital transmission signal (TX) to ensure that the bus is in its idle state at the time of measurement.

However, this method has the disadvantage that according to protocol it cannot be excluded that the bus is not in its idle state at the time of measurement. Especially with the Controller Area Network (CAN) protocol the bus may also be in its active state (acknowledge bit/arbitration phase/error flags) also without a transmission signal (TX) being present, and falsify the measurement of the ground offset in this way; this leads to an erroneous indication of ground defects.

SUMMARY OF THE INVENTION

Starting from the disadvantages and shortcomings shown above and while acknowledging the outlined state of the art, the present invention has for an object to improve a method of the type defined in the opening paragraph as well as a circuit arrangement of the type defined in the opening paragraph in that, on the one hand, prior to a breakdown event, already a warning can be obtained in this respect that the state of the ground connection between the control units is no longer optimal but, on the other hand, ground defects are not shown by mistake.

This object is achieved by a method having the characteristic features defined in claim 1 as well as a circuit arrangement having the characteristic features defined in claim 5. Advantageous embodiments and effective further aspects of the present invention are characterized in the respective dependent claims.

Therefore, the present invention is based on the fact that a ground offset or potential offset between component parts, more particularly between control units (Electronic Control Units (ECUs) in a system is certainly detected with a serial bus system such as, for example, with a Controller Area Network (CAN) bus; such control units (ECUs) are, for example, microcontrollers (μC) equipped with flash memory units, application controllers or protocol controllers or also system chips.

The mechanism in accordance with the present invention now allows to suppress an erroneous measurement caused by protocol interference. A specialty of the present invention is to be found in this connection in that the measurement of the idle potential on the bus is not made dependent on the transmission signal (TX), but that the receiver signal (R) is captured and evaluated.

In accordance with a highly inventive embodiment of the present invention at least two timer units are started when the at least one bus receiver becomes recessive (=idle state of the bus), which timer units run as long as the bus remains recessive. After the first timer unit has run for a predefinable time, the level of one or more bus lines is scanned and compared with at least one predefinable limit value; the comparison is then made with a certain time lag or within a defined time window, respectively, after the line has stabilized at a certain potential.

The comparison may then, for example, be advantageously activated when a certain minimum load current flow is flowing in the respective part of the circuit arrangement. At any rate the conclusion is a defective ground contact if the limit value or values is or are exceeded and then an internal ground error signal is generated.

If the bus now continues to be in its idle state for a predefinable time period until the second timer unit has run, it is ensured that the previous scanning really took place during the idle phase of the bus and that the result was valid; this advantageously implies that in the space of time between the elapse of the predefinable first time period and the elapse of the predefinable second time period the generated ground error signal is buffered in a diagnostic memory in the form of an entry relating to the respective component part when the deviation is detected; and when the bus system is still in the recessive i.e. idle state after the predefinable second time period has elapsed, the ground error signal can be issued at the end of the circuit arrangement.

Such issuing of the ground error signal at the end of the circuit arrangement i.e. a detection of the deviation above the limit or threshold value concerning the respective component parts may, for example, lead to a shift of the one-wire receive thresholds. Alternatively, or as a complement to this, may be provided that in case of a recognized deviation above the limit or threshold value by the respective component part data can only be transmitted when at least one control unit is free of load current.

If, on the other hand, the bus, is active prior to the run of the second timer unit, or becomes dominant (=no idle level any more), both the first timer unit and the second timer unit are reset and the measurement of the ground offset is rejected, which is the same as a deletion or resetting of the ground error signal after the predefinable second time period has elapsed. In other words this means that the measurement of the ground offset cannot be evaluated and issued until both the first timer unit and the second timer unit have run completely, without this leading to a change of the bus state from recessive (idle state) to active (no idle state).

In accordance with a preferred embodiment the respective delay of the timer units is adapted to the transmission section bit rate used. As already explained before, there should be an idle phase at regular intervals in the communication in the bus system, which phase at least has the length of the second timer unit, to be able to make a ground evaluation. This provides a secure way of extracting all the disturbing events in reliable manner in accordance with the method known from document WO 97/36184 A1 and there is always a reliable indication of a real correct ground offset.

In accordance with a highly inventive further embodiment of the present method as well as the present circuit arrangement, a multiple error query of the ground offset is possible before the decision is made of the error indication "error".

The present invention finally relates to the use of a method of the type shown previously and/or at least a circuit arrangement of the type represented previously for detecting the ground offset of parts of a network system, more particularly for testing the ground contact between network control units such as microcontrollers (application controllers, protocol controllers, . . . ) with flash memory units or system chips in automotive electronics, more particularly in the electronics of motor vehicles.

According to the invention it is also conceivable to use the method and arrangement in a motor vehicle, the comparison of the battery voltage taking place beyond a certain number of revolutions.

BRIEF DESCRIPTION OF THE DRAWINGS

As already stated before, there are various possibilities of configuring the teaching of the present invention in an advantageous manner and improving same. For this purpose, on the one hand, reference is made to the claims that depend on claims 1 and 5 and, on the other hand, further embodiments, characteristic features and advantages of the present invention will be further explained with reference to the exemplary implementation in accordance with an embodiment shown in FIG. 1.

DESCRIPTION OF PREFERRED EMBODIMENTS

Figure 1:
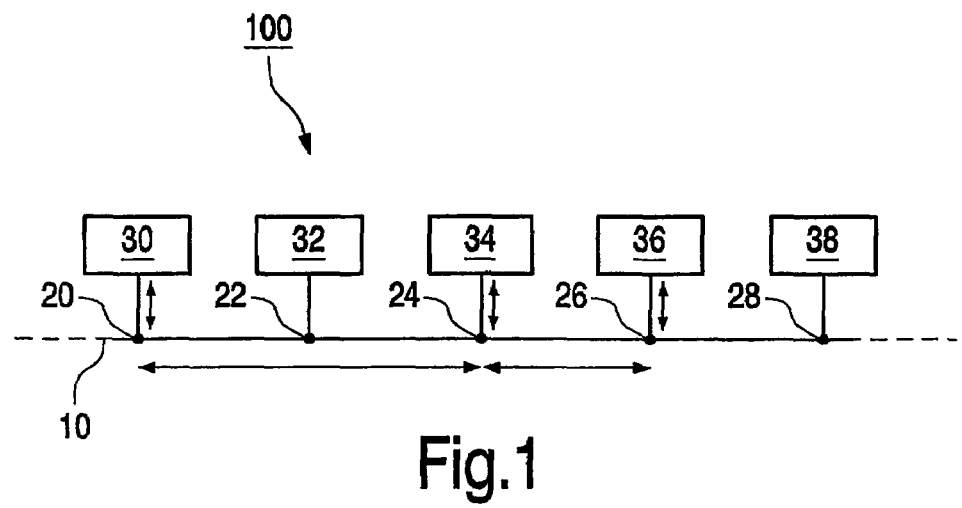
FIG. 1 shows in a block diagram an example of embodiment for a circuit arrangement in accordance with the present invention.
Figure 2:
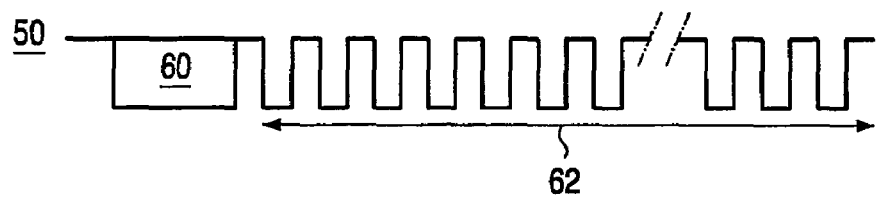
Figure 2:
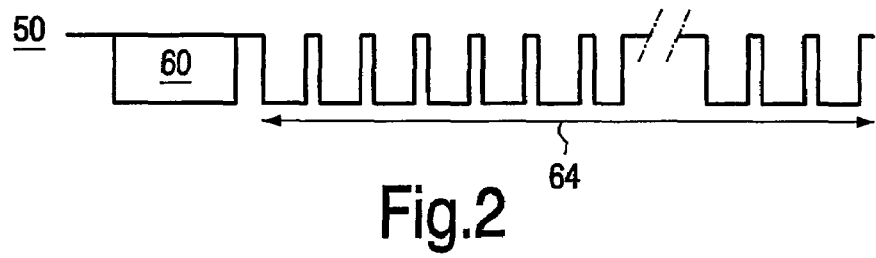
Figure 3:
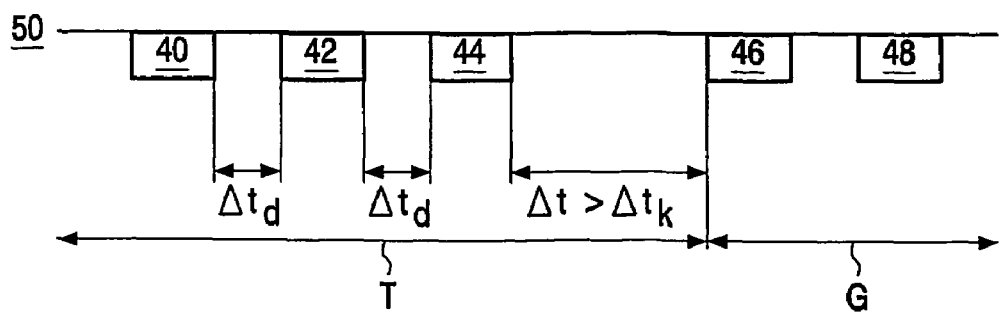

FIG. 1 diagrammatically shows a circuit arrangement 100 by means of which an error-affected ground contact and/or a ground offset of parts of a network system—also a plurality or multitude of—can be detected; more specifically the circuit arrangement 100 is used for checking the ground contact between network control units such as, for example, microcontrollers (application controller, protocol controllers, . . . ) with flash memory units, or system chips in automotive electronics, in which data can be received via the serial Controller Area Network (CAN) bus system 10, 12 leading to a receiver unit 20.

In the example of embodiment the evaluation of the CANH[igh] signal is shown by way of example (basically, both bus signals i.e. both the signal on the CANH[igh] bus line 10 and the signal on the CANL[ow] bus line 12 can be evaluated).

If the idle state (signal state "1") has bee reached on the CAN bus system 10, 12 and especially on the receiver line 24 connected to the output terminal 22 of the receiver unit 20, a first timer unit 30 connected downstream of the receiver unit 20 as well as a second timer unit 50 connected downstream of the receiver unit 20 will start. In this connection it may be learnt from FIG. 1 that the output terminal 22 of the receiver unit 20 is connected to both the input terminal 32 of the first timer unit 30 and to the input terminal 52 of the second timer unit 50.

If this idle state continues to last for the time space of the delay of the first timer unit 30, at the output 34 of the first timer unit 30 an edge of this delay will trigger the clock input of a first D[elay] flipflop element 40 connected downstream of the first timer unit, and the result of a comparator unit 70 assigned to the CANH[igh] bus line 10 applied to the first D[elay] flipflop element 40 via its D-input 44 is buffered. In this connection it may be learnt from FIG. 1 that the output terminal 34 of the first timer unit 30 is connected to the clock input 42 of the first D[elay] flipflop element 40.

Such a buffered result is realized in that after the first time period has elapsed, which is predefinable by the first timer unit 30, the level voltage 14 of the CANH[igh] bus line 10 is scanned and compared with a predefinable reference potential value 80 by the comparator unit 70, where the contacts of the reference user may be provided twice; if the level voltage 14 exceeds the reference potential value 80, the ground error signal 82 (=signal state "1" in case of ground offset; otherwise signal state "0" in case of "o.k." i.e. if there is no ground offset) generated by this exceeding will be delivered by the output terminal 76 of the comparator unit 70 to the D-input 44 of the first D[elay] flipflop element 40. In this connection it may be learnt from FIG. 1 that the output terminal 76 of the comparator unit 70 is connected to the D-input 44 of the first D[elay] flipflop element 40.

Now if the idle state remains on the CAN bus system 10, 12 and especially on the receiver line 24 downstream of the output terminal 22 of the receiver unit 20 not only for the time space of the delay of the first timer unit 30, but also for the time space of the delay of the second timer unit 50 (the second timer unit 50 is connected in parallel to the first timer unit 30; the delay of the second timer unit 50 is longer than the delay of the first timer unit 30), an edge of a second D[elay] flipflop element 60 (the output terminal 54 of the second timer unit 50 is connected to the clock input 62 of the second D[elay] flipflop element 60; see FIG. 1) connected downstream of the second timer unit 50 takes over the intermediate result of the measurement of the ground offset after the delay of also the second timer unit 50 has elapsed.

The respective signal path of the intermediate result of the measurement of the ground offset runs from the Q-output 46 of the first D[elay] flipflop element 40, via the D-input 64 of the second D[elay] flipflop element 60, to the Q-output 66 (signal state "1"=ground error) of the second D[elay] flipflop element 60. In this connection it may be learnt from FIG. 1 that the Q-output 46 of the first D[elay] flipflop element 40 is connected to the D-input 64 of the second D[elay] flip-flop element 60.

In the outcome the second D[elay] flipflop element 60 connected downstream of the second timer unit 50 takes over the ground error signal 82 from the comparator unit 70 and passes it on to its Q-output 66 if the idle status of the CAN bus lines 10, 12 or of the receiver line 24 still exists when the second time period predefined by the second timer unit 50 has elapsed, which time period was started simultaneously with the predefined first time period and lasts longer than the predefined first time period. Thus a decisive factor for the function is that the second timer unit 50 has a longer delay than the first timer unit 30, while both the delay of the first timer unit 30 and also the delay of the second timer unit 50 are adapted to the bit rate of the CAN bus line 10, 12.

If, on the other hand, before the second timer unit 50 has run, an active bus signal occurs (signal state "0" on the receiver line 24), the two timer units 30, 50 as well as the first D[elay] flipflop element 40 are reset and the ground error output signal 82 remains unaffected; in other words this means that a previously set ground offset at the output continues to be in exactly the same state as an error-free state detected previously.

Summarizing it may be stated that the circuit arrangement 100 shown in FIG. 1 implements a method of detecting the ground offset between networked control units, in which the receiver signal (RX) is evaluated by two timer units 30, 50 and the timer units 30, 50 are not active until the receiver signal (RX) indicates the idle state of the bus 10, 12, 24.

The comparison of the bus signal 14 with an operating voltage 80 is made after the first timer 30 has run, while the voltages to be measured are applied to an input 72 of the comparator unit 70 and the potentials with which the voltages to be measured should be compared are applied to the respective other input 74 of the comparator unit 70. The various potentials which are applied to the inputs 72, 74 of the comparator unit 70 can be generated from a voltage by at least one multiplexer and applied to the respective inputs 72, 74 of the comparator unit 70.

The result of this comparison is buffered without being immediately emitted; the comparison result will rather not be emitted until the second timer 50 has run, which has a longer run time than the first timer 30 and only if the receiver signal (RX) has indicated a stable idle state until the second timer 50 has shown a stable idle state.

If the receiver signal (RX), on the other hand, has meanwhile left its idle state i.e. between the run of this first timer 30 and the run of the second timer 50, the two timers 30, 50 will be reset as will the buffered result of the comparison.

LIST OF REFERENCES

100 circuit arrangement
10 bus line, more particularly CANH[igh] bus line
12 bus line, more particularly CANL[ow] bus line
14 level voltage
20 receiver unit
22 output terminal of the receiver unit 20
24 receiver line
30 first timer unit
32 input terminal of the first timer unit 30
34 output terminal of the first timer unit 30
40 first switch or trigger element more particularly first (D[elay]) flipflop element
42 clock input of the first switch or trigger element 40
44 D-input of the first switch or trigger element 40
46 Q-output of the first switch or trigger element 40
50 second timer unit
52 input terminal of the second timer unit 50
54 output terminal of the second timer unit 50
60 second switch or trigger element, more particularly second (D[elay]) flipflop element
62 clock input of the second switch or trigger element 60
64 D-input of the second switch or trigger element 60
66 Q-output of the second switch or trigger element 60
70 comparator unit
72 first input terminal of the comparator unit 70
74 second input terminal of the comparator unit 70
76 output terminal of the comparator unit 70
80 limit or reference potential value
82 ground error signal

The invention claimed is:

1. A method of detecting the ground offset of parts of a network system, more particularly of testing the ground contact between network control units, where data are sent and received over at least one bus system, characterized in
    [a] that in the idle state of at least one bus line (10, 12) provided for receiving data and/or of at least one receiver line (24), after a predefinable first time period has elapsed, the level voltage (14) of this at least one bus line (10, 12) is scanned and compared with at least one predefinable limit or reference potential value (80),
    [b] that if the limit or reference potential value (80) is exceeded, at least one ground error signal (82) is generated, and
    [c] that in dependence on the fact whether until a predefinable second time period has elapsed, which is started at the same time as the predefinable first time period and is longer than the predefinable first time period,
    [c.1] the idle state of the at least one bus line (10, 12) or of the at least one receiver line (24) is still there, or
    [c.2] the idle state of the at least one bus line (10, 12) or of the at least one receiver line (24) is no longer there, the ground error signal is acknowledged or not acknowledged, respectively.

2. A method as claimed in claim 1, characterized in that in the space of time between the end of the predefinable first time period and the end of the predefinable second time period the ground error signal (82) generated in the method step [b] is buffered without being output.

3. A method as claimed in claim 2, characterized
    in that in case of the method step [c.1] the ground error signal (82) is output after the predefinable second time period has elapsed, or
    in that in case of the method step [c.2] a ground error signal (82) is deleted or reset after the predefinable second time period has elapsed.

4. A method as claimed in claim 1, characterized in that the predefinable first time period and the predefinable second time period are adapted to the bit rate of the bus line (10, 12).

5. A use of a method as claimed in claim 1 for detecting the ground offset of parts of a network system, more particularly for checking the ground contact between network control units in automotive electronics, more particularly in the electronics of motor vehicles.

6. A circuit arrangement (100) for detecting the ground offset of parts of a network system, more particularly for checking ground contact between network control units while data can be sent and received over at least one bus system, characterized by
    at least one comparator unit (70) which is assigned to at least one bus line (10, 12) provided for the received data and leading to at least one receiver unit (20), while in the idle state of this at least one bus line (10, 12) and/or at least one receiver line (24) connected downstream of the receiver unit (20), after a first time period has elapsed that can be predefined by at least a first timer unit (30), the level voltage (14) of this at least one bus line (10, 12) can be scanned and compared to at least one predefinable limit or reference potential value (80) by means of the comparator unit (70),
    at least a first switch or trigger element (40) connected downstream of the first timer unit (30) for buffering at least one ground error signal (82) produced by the comparator unit (70) when the limit or reference potential value (80) is exceeded, at least a second switch or trigger element (60) connected downstream of at least a second timer unit (50) for taking over or transferring the ground error signal (82) for the case where the idle state of the at least one bus line (10, 12) or of the at least one receiver line (24) still exists until a second time period that can be predefined by the second timer unit (50) has elapsed, which second time period is started at the same time as the predefinable first time period and lasts longer than the predefinable first time period.

7. A circuit arrangement as claimed in claim 6, characterized in that the bus system (10, 12) is arranged as a Controller Area Network (CAN) bus system having at least one CANH[igh] bus line (10) and at least one CANL[ow] bus line (12), and in that the output terminal (22) of the receiver unit (20) is connected both to the input terminal (32) of the first timer unit (30) nd to the input terminal (52) of the second timer unit (50), in that the first switch or trigger element (40) is arranged as a first flipflop element, more particularly as a first D[elay] flipflop element and in that the second switch or trigger element (60) is arranged as a second flipflop element more particularly as a second D[elay] flipflop element.

8. A circuit arrangement as claimed in claim 6, characterized in that the output terminal (34) of the first timer unit (30) is connected to the clock input (42) of the first D[elay] flipflop element (40), in that the output terminal (76) of the comparator unit (70) is connected to the D-input (44) of the first D[elay] flipflop element (40), in that the output terminal (54) of the second timer unit (50) is connected to the clock input (62) of the second D[elay] flipflop element (60) and in that the Q-output (46) of the first D[elay] flipflop element (40) is connected to the D-input (64) of the second D[elay] flipflop element (60).

9. A circuit arrangement as claimed claim 6, characterized in that the second timer unit (50) is connected in parallel to the first timer unit (30).

10. A circuit arrangement as claimed in claim 6, characterized in that the delay of the first timer unit (30) and the delay of the second timer unit (50) can be adapted to the bit rate of the bus line (10, 12).

* * * * *